US010583753B2

(12) United States Patent
Lorey et al.

(10) Patent No.: US 10,583,753 B2
(45) Date of Patent: Mar. 10, 2020

(54) ROLLER GUIDE

(71) Applicant: GRAMMER AG, Amberg (DE)

(72) Inventors: Konstantin Lorey, Schmidgaden (DE);
Gerhard Delling, Schmidgaden (DE)

(73) Assignee: GRAMMER AG, Amberg (DE)

(*) Notice: Subject to any disclaimer, the term of this patent is extended or adjusted under 35 U.S.C. 154(b) by 177 days.

(21) Appl. No.: 15/986,029

(22) Filed: May 22, 2018

(65) Prior Publication Data

US 2018/0339608 A1 Nov. 29, 2018

(30) Foreign Application Priority Data

May 23, 2017 (DE) .................. 10 2017 111 206

(51) Int. Cl.
*B60N 2/02* (2006.01)
*B60N 2/07* (2006.01)
(Continued)

(52) U.S. Cl.
CPC ......... *B60N 2/0727* (2013.01); *B60N 2/0715* (2013.01); *B60N 2/0722* (2013.01);
(Continued)

(58) Field of Classification Search
CPC ........... B65H 2511/112; B65H 2513/10; A01F 15/141; A22B 5/161; B41F 31/002;
(Continued)

(56) References Cited

U.S. PATENT DOCUMENTS 4,597,339 A * 7/1986 McCaffrey ......... B65D 19/0095
104/135
5,251,864 A * 10/1993 Itou ...................... B60N 2/502
248/588
(Continued)

FOREIGN PATENT DOCUMENTS

DE 102006021886 10/2007
DE 102006059088 6/2008
(Continued)

OTHER PUBLICATIONS

Search Report for German Patent Application No. 102017111206.5, dated Mar. 13, 2018, 3 pages.
(Continued)

*Primary Examiner* — Kiran B Patel
(74) *Attorney, Agent, or Firm* — Sheridan Ross P.C.

(57) ABSTRACT

Roller guide comprising at least one guide rail, which has at least one first and one second planar region, and comprising a first and a second roller, which are each in contact with the guide rail and roll thereon, wherein the first and the second roller are mounted so that they are rotatable about a common axis of rotation and are formed rotationally-symmetrically about the axis of rotation and a radius of the first roller is smaller than a radius of the second roller, the first roller has a first circular-segment-shaped surface rolling region and the second roller has a second circular-segment-shaped surface rolling region and a centre point of the first surface rolling region and a centre point of the second surface rolling region are arranged on the axis of rotation.

14 Claims, 6 Drawing Sheets

(51) Int. Cl.
    *B60N 2/16*     (2006.01)
    *B60N 2/50*     (2006.01)
    *F16C 13/00*     (2006.01)
    *F16C 29/04*     (2006.01)

(52) U.S. Cl.
    CPC .............. *B60N 2/162* (2013.01); *B60N 2/502* (2013.01); *B60N 2/508* (2013.01); *F16C 13/006* (2013.01); *F16C 29/045* (2013.01)

(58) Field of Classification Search
    CPC ...... F16H 55/30; F16H 7/06; F16H 2055/086; G03G 15/09; B21B 31/26
    USPC ...................................................... 293/65.13
    See application file for complete search history.

(56) References Cited

U.S. PATENT DOCUMENTS

| | | | | |
|---|---|---|---|---|
| 5,979,964 A * | 11/1999 | Ban | | B60N 2/3011 |
| | | | | 296/65.09 |
| 6,056,346 A * | 5/2000 | Smuk | | B60N 2/01583 |
| | | | | 248/429 |
| 6,059,345 A * | 5/2000 | Yokota | | B60N 2/3011 |
| | | | | 248/430 |
| 6,200,032 B1 | 3/2001 | Ropp | | |
| 6,347,834 B1 * | 2/2002 | Couasnon | | B60N 2/01591 |
| | | | | 296/65.09 |
| 6,488,250 B1 * | 12/2002 | Munch | | B60N 2/0715 |
| | | | | 248/430 |
| 6,655,702 B2 * | 12/2003 | Senger | | B60N 2/01541 |
| | | | | 280/30 |
| 6,953,178 B2 * | 10/2005 | Yamada | | B60N 2/0705 |
| | | | | 248/429 |
| 8,061,755 B2 * | 11/2011 | Brendel | | A47C 3/0257 |
| | | | | 296/65.15 |
| 9,126,505 B2 * | 9/2015 | Moriyama | | B60N 2/01 |
| 9,440,559 B2 * | 9/2016 | Gundall | | B60N 2/508 |
| 10,011,195 B2 * | 7/2018 | Kume | | B60N 2/0715 |
| 2006/0192418 A1 * | 8/2006 | Meyer | | B60N 2/0715 |
| | | | | 297/246 |
| 2008/0036232 A1 * | 2/2008 | Randjelovic | | B60N 2/0735 |
| | | | | 296/65.13 |
| 2008/0203753 A1 * | 8/2008 | Klein | | B60N 2/005 |
| | | | | 296/65.13 |
| 2009/0243325 A1 * | 10/2009 | Villeminey | | B60N 2/065 |
| | | | | 296/65.09 |
| 2011/0233371 A1 * | 9/2011 | Kitamura | | B60N 2/07 |
| | | | | 248/430 |
| 2013/0306825 A1 * | 11/2013 | Brodersen | | B60N 2/507 |
| | | | | 248/419 |
| 2018/0001791 A1 * | 1/2018 | Kume | | B60N 2/0705 |
| 2018/0086230 A1 * | 3/2018 | Kume | | B60N 2/0705 |
| 2018/0086231 A1 * | 3/2018 | Kume | | A47C 1/12 |
| 2018/0086232 A1 * | 3/2018 | Kume | | B60N 2/0722 |

FOREIGN PATENT DOCUMENTS

| | | |
|---|---|---|
| DE | 102012004784 | 7/2013 |
| EP | 1623867 | 2/2006 |

OTHER PUBLICATIONS

Extended Search Report for European Patent Application No. 18171284.5, dated Nov. 6, 2018, 3 pages.

Official Action (English machine translation) for Chinese Patent Application No. 201810498357.5, dated Jul. 2, 2019, 2 pages.

* cited by examiner

ROLLER GUIDE

CROSS-REFERENCE TO RELATED APPLICATIONS

This application claims the benefit of German Patent Application No. DE 10 2017 111 206.5 filed May 23, 2017, the entire contents of which are incorporated herein by reference.

FIELD

The invention relates to a roller guide comprising at least one guide rail, which has at least one first and one second planar region, and comprising a first and a second roller, which are each in contact with the guide rail and roll thereon, wherein the first and the second roller are mounted so they are rotatable about a common axis of rotation and are formed rotationally-symmetrically about the axis of rotation and a radius of the first roller is smaller than a radius of the second roller.

In particular, the invention also relates to a vehicle seat comprising a roller guide.

BACKGROUND

A roller guide for a longitudinally-adjustable vehicle seat is known from EP 1 623 867 B1, wherein at least one of the rollers shown is designed in the form of a cone or truncated cone. This application has the disadvantages, inter alia, that a greater radial force acts on the conical roller in the event of a lateral load. Furthermore, a noticeable slip arises on the corresponding conical surface of the conical roller because of different rolling radii of the conical roller.

One consequence thereof is increased friction and increased wear, which results in worse behaviour in operation.

SUMMARY

Accordingly, it is the object of the present invention to overcome the disadvantages of the prior art and to present a novel roller guide, in particular a roller guide for vehicle seats.

This object is achieved according to the features of claim 1. Advantageous embodiments of the invention are found in the dependent claims.

The core concept of the invention is to provide a roller guide comprising at least one guide rail, which has at least one first and one second planar region, and comprising a first and a second roller, which are each in contact with the guide rail and roll thereon, wherein the first and the second roller are mounted so that they are rotatable about a common axis of rotation and are formed rotationally-symmetrically about the axis of rotation and a distance of the first roller to the axis of rotation is less than a distance of the second roller to the axis of rotation, wherein the first roller has a first circular-segment-shaped surface rolling region having a first radius and the second roller has a second circular-segment-shaped surface rolling region having a second radius and a centre point of the first surface rolling region and a centre point of the second surface rolling region are arranged on the axis of rotation.

A distance to the axis of rotation is preferably to be understood as a distance in the radial direction of the axis of rotation, in particular the maximum distance in the radial direction.

In particular, the first roller is in contact with the first planar region and the second roller is in contact with the second planar region.

Rolling is to be understood, of course, as a rolling movement of the rollers. That is to say, during a linear movement of the rollers in the guide rail, a rolling movement of the rollers about the axis of rotation is generated. The guide rail is preferably connected to a seat upper part and/or a seat lower part, wherein in contrast, the rollers are connected, for example, to a scissors arm of a scissors framework and roll inside the guide rail during a deflection of the scissors framework.

According to the invention, the first roller has a first circular-segment-shaped surface rolling region and the second roller has a second circular-segment-shaped surface rolling region. The disadvantages of the prior art can be remedied in particular by the at least partially circular-segment-shaped design of the rollers. More precisely, the rollers have a ball-shaped or spherical running surface. In a cross section of the rollers, this surface can be seen and/or shown as a circular-segment-shaped region.

The extension direction of the axis of rotation is preferably perpendicular to the direction of the rolling movement.

According to one particularly preferred embodiment, the first roller is in contact by means of the first circular surface rolling region with the first planar region via a first contact point and the second roller is in contact by means of the second circular-segment-shaped surface rolling region with the second planar region via a second contact point.

Of course, it is conceivable in this case, that a plurality of contact points is provided. Due to the reduction of the contact points, it is generally possible to minimise the friction of the rollers with the guide rail. According to a further preferred embodiment, however, the first roller is exclusively in contact by means of the first contact point with the first planar region and the second roller is exclusively in contact by means of the second contact point with the planar region. In this way, it is possible to minimise the friction still further.

Preferably, the first contact point is arranged in an upper region and the second contact point is arranged in a lower region of the guide rail. The first contact point assumes the absorption of forces in this case, which occur in the vertical direction or in the direction of the axis of rotation, while in contrast, the second contact point assumes clamping of the first roller, because, according to the invention, the radial distance of the first roller is less than the radial distance of the second roller to the axis of rotation. In particular, forces which occur in the event of load change or the like are absorbed by the first roller.

According to a further preferred embodiment, the first circular-segment-shaped surface rolling region and the second circular-segment-shaped surface rolling region are arranged in a common plane which comprises the axis of rotation.

Furthermore, the respective contact points are advantageously also points of the common plane.

The common plane particularly advantageously extends in the direction of the axis of rotation and in the vertical direction of the roller guide, in particular the guide rail.

Of course, it is also decisive in this case, which shape or which design the guide rail has, in particular the planar region. According to one preferred embodiment, the first planar region has a first circular-segment-shaped portion having a radius which is greater than the first radius of the first circular-segment-shaped surface rolling region, or the first planar region has a first level portion.

The circular arcs of the first circular-segment-shaped portion and the first circular-segment-shaped surface rolling region preferably touch in precisely one point, namely the first contact point. If the first planar region has a level portion, the same thus applies accordingly, that the first level portion and the first circular-segment-shaped surface rolling region touch in precisely the first contact point.

According to a further embodiment, the second planar region has a second level portion. It is also conceivable here that the second level portion is only in contact with the second roller by means of the second contact point.

According to a further embodiment, the roller guide has a shaft rotatable about the axis of rotation, on which the first roller and the second roller are arranged, wherein the shaft has at least one pre-tensioned spring element at a first end and wherein the spring element is at least in operational contact with the first roller.

In this way, it is possible in particular that forces which arise due to movement of the shaft in the direction of the longitudinal extension of the axis of rotation can be absorbed better, and therefore the rollers are not damaged.

The pre-tensioned spring element preferably consists at least in part of an elastomer, particularly preferably of Cellasto.

Alternatively thereto, it is conceivable that the pre-tensioned spring element has a ball element and a pre-tensioned compression spring, wherein the ball element is pre-tensioned by means of the compression spring. The ball element is preferably in contact both with the compression spring on the one side and with the first roller on the other side.

According to a further preferred embodiment, it is possible to improve the running properties of the rollers. According to this embodiment, the bearings of the first roller and the second roller are each selected from a group comprising a needle bearing, a ball bearing, or a combination thereof.

Still more advantageously, according to a further embodiment, the forces acting on the roller guide can be absorbed and distributed, if the first roller has a third circular-segment-shaped surface rolling region having a third centre point, which is arranged on the axis of rotation, wherein the first roller is additionally in contact by means of the third circular-segment-shaped surface region with a third planar region of the guide rail via a third contact point.

The third planar region, similarly to the first planar region, can preferably have a third circular-segment-shaped portion having a third radius, which is larger than the one radius of the third circular-segment-shaped surface rolling region, or wherein the third planar region has a third level portion.

Because the first roller is in contact via the first and the third contact point with the guide rail, the force in the direction of the axis of rotation can now be absorbed by the first contact point, while in contrast, the force in the vertical direction, i.e. perpendicular to the axis of rotation, can be absorbed by the third contact point. The function of the second contact point does not change.

According to a further preferred embodiment, the first contact point and the third contact point have the same radial distance to the axis of rotation.

In this way, the first and the third contact point have the same linear velocity, whereby the slip of the first roller can also be reduced or even avoided entirely.

Particularly advantageously, the first roller is in contact exclusively with the first planar region and the third planar region and the second roller is exclusively in contact with the second planar region.

The friction can also be reduced to a certain minimum in this way.

Further advantageous embodiments result from the dependent claims.

BRIEF DESCRIPTION OF THE DRAWINGS

Further objectives, advantages, and advantageous features of the present invention can be inferred from the following description in conjunction with the drawings. In the drawings.

DETAILED DESCRIPTION

Figure 1:
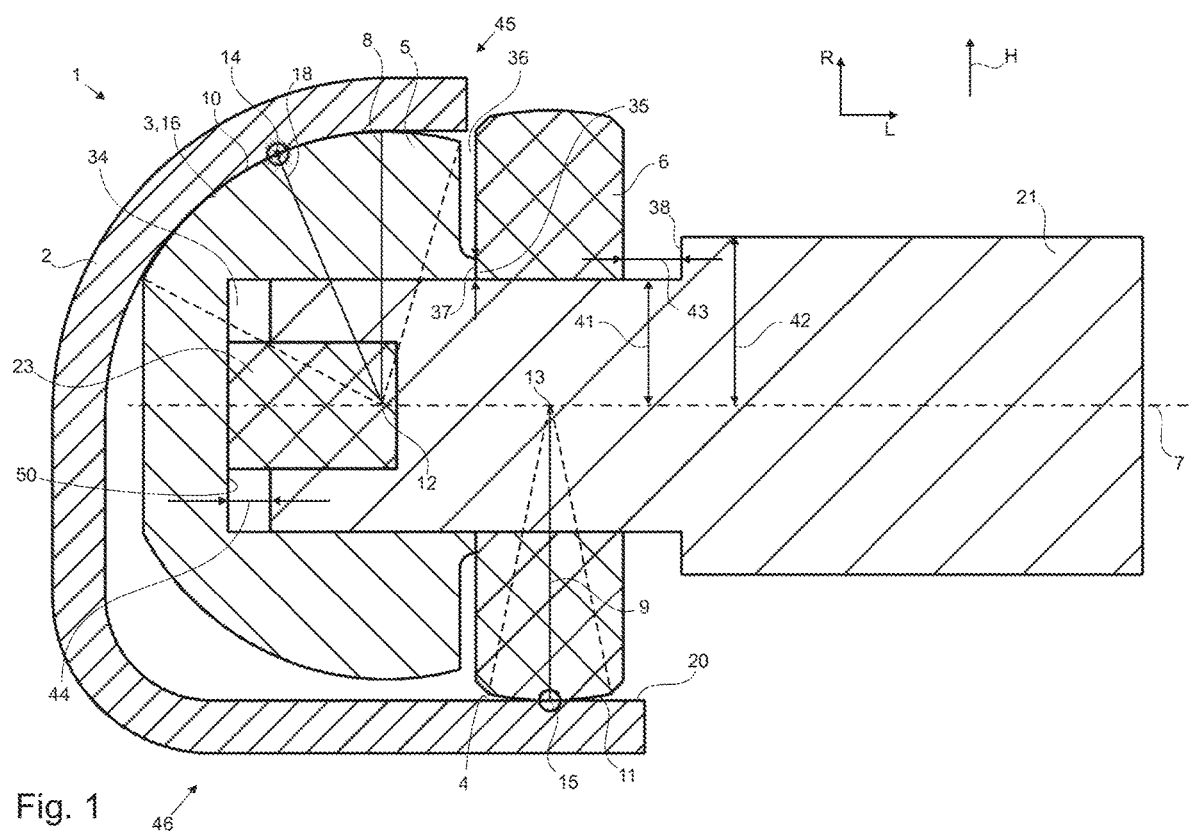
FIG. 1 shows a roller guide according to a first embodiment.

The roller guide 1 shown in FIG. 1 has, according to the invention, a guide rail 2 comprising a first planar region 3 and a second planar region 4. Furthermore, a first roller 5 and a second roller 6 can be seen, which are arranged so that they are rotationally-symmetrical and mounted to rotate about a common axis of rotation 7. The rollers 5, 6 are preferably arranged on a shaft 21, which extends in the extension direction L of the axis of rotation 7.

Furthermore, the maximum radial distance 8 of the first roller 5 is less than the maximum radial distance 9 of the second roller. 'Radial' generally relates to being viewed in the radial direction R of the axis of rotation 7.

In addition, the first roller 5 has a first circular-segment-shaped surface rolling region 10 having a first centre point 12 and the second roller 6 has a second circular-segment-shaped surface rolling region 11 having a second centre point 13, wherein the first and the second centre points 11, 12 are arranged on the axis of rotation 7.

More precisely, the first roller 5 and the second roller 6 have a spherical-surface region 10, which is illustrated in the cross section shown as a circular-segment-shaped surface rolling region 10, 11.

According to FIG. 1, in this case, the maximum distance 8 corresponds to the radius of the first circular-segment-shaped surface rolling region 10 and the maximum distance 9 corresponds to the radius of the second circular-segment-shaped surface rolling region 11.

Also according to the invention, the first roller 5 is in contact with the first planar region 3 of the guide rail by means of a first contact point 14. In particular, the first planar region 3 has a first circular-segment-shaped portion 16, which is in contact with the first surface rolling region 10 by means of the first contact point 14. The radius of the first circular-segment-shaped portion 16 is larger in this case than the first radius of the first surface rolling region 10. In particular, it is to be noted that the centre point of the first circular-segment-shaped portion 16 is not arranged on the axis of rotation 7.

The circular-segment shape of the first circular-segment-shaped surface rolling region 10 and the second circularsegment-shaped surface rolling region 11 is illustrated by the corresponding circular arc and by means of dashed lines.

In this embodiment, the first planar region 3 has a first circular-segment-shaped portion 16, which has a radius which is larger than a first radius of the first surface rolling region 10.

In addition, a spring element 23 can be seen in FIG. 1, which, in the present case, is arranged at a first end 22 of the shaft 21 and is in contact with the shaft 21 and also with the first roller 5. During movements of the shaft 21 in the extension direction L, the occurring forces can be absorbed by the spring element 23. The spring element 23 is advantageously pre-tensioned and consists at least in part of an elastomer, particularly preferably of Cellasto. In particular, the spring element 23 is only in contact with an inner end face 50 of the first roller 5, and therefore occurring friction forces can be minimised in this way.

Furthermore, the occurring forces of the movement of the shaft 21 along the direction L can be absorbed still better by the spring element 23, if a free space 34 is provided at least in part about the spring element 23 between the first roller 5 and the first end 22 of the shaft 21. This allows a relative movement of the shaft 21 in relation to the first roller 5 and the spring travel of the spring element 23 is increased in this way.

Furthermore, the first roller 5 and the second roller 6 are in contact via a contact surface 35, which has a predetermined extent 37 viewed in the radial direction R. The extent 37 is particularly preferably designed such that a relief region 36 is furthermore arranged between the first roller 5 and the second roller 6, and therefore in particular during movement of the shaft 21 in the direction L, a certain play is provided between the first roller 5 and the second roller 6, since the second roller 6 has the first contact point 14 opposite to the second contact point 15. 'Opposite' in the present case means that the second contact point 15 lies on the other side of the axis of rotation 7 in relation to the axis of rotation 7 than the first contact point 14.

Of course, it is also conceivable that the first roller 5 and the second roller 6 do not touch, i.e. do not form a contact surface.

The second roller 6 has a second circular-segment-shaped surface rolling region 11, which is in contact with a second planar region 4 of the guide rail 2 by means of a second contact point 15. In particular, the second planar region 4 has a second level portion 20, wherein a normal vector (not shown here) of the second level portion 20 extends in the radial direction R and the distance of the second level portion 20 corresponds to the radius 9 of the second surface rolling region 11.

The first planar region 3 is also arranged on the other side in relation to the axis of rotation 7 than the second planar region 4. As a result, since according to the invention the maximum distance of the first roller 5 is less than the maximum distance of the second roller 6 in the radial direction R, the first roller 5 is only in contact with the first planar region 3 and the second roller 6 is only in contact with the second planar region 4.

The shaft 21 preferably furthermore has a front region 39 and a rear region 40, which are connected to one another by means of a transition region 38. The first roller 5 and the second roller 6 are preferably connected to the front region 39 and mounted in relation thereto, wherein the front region 39 has a front distance 41 from the axis of rotation 7 which is less than a rear distance 42 from the axis of rotation, each in the radial direction R. Viewed in the extension direction L, the second roller 6 is arranged at a longitudinal distance 43 from the transition region 38. The length of the longitudinal distance 43 preferably corresponds to a length of a longitudinal extension 44 of the free space 34, whereby the transition region 38 is used as an end stop in the event of a relative movement of the shaft 21 to the first roller 5. However, it is also conceivable that the length of the longitudinal distance 43 is greater than the length of the longitudinal extension 44.

The guide rail 2 is preferably formed essentially U-shaped, wherein one leg of the U is not as long as the other leg of the U. In particular, the longer leg 46 has the second planar region 4 and the shorter leg 45 has the first planar region 3. In particular, the second roller 6 is only in contact with the longer leg 46 and not with the shorter leg 45. The situation is reversed with respect to the first roller 5, which is only in contact with the shorter leg 45 and not with the longer leg 46.

However, it is also conceivable that the legs 45, 46 are of equal length, but the leg 45 is shaped such that it is not in contact with the second roller 6.

The first contact point 14, in particular, absorbs forces in the direction L and in the direction R, in particular in the vertical direction H of the guide rail 2, while in contrast the second contact point 15, in particular clamping of the first roller 5 because of the relative dimensions in relation to one another and also absorbs forces in the direction H, in particular in the event of load changes or the like.

Figure 2:
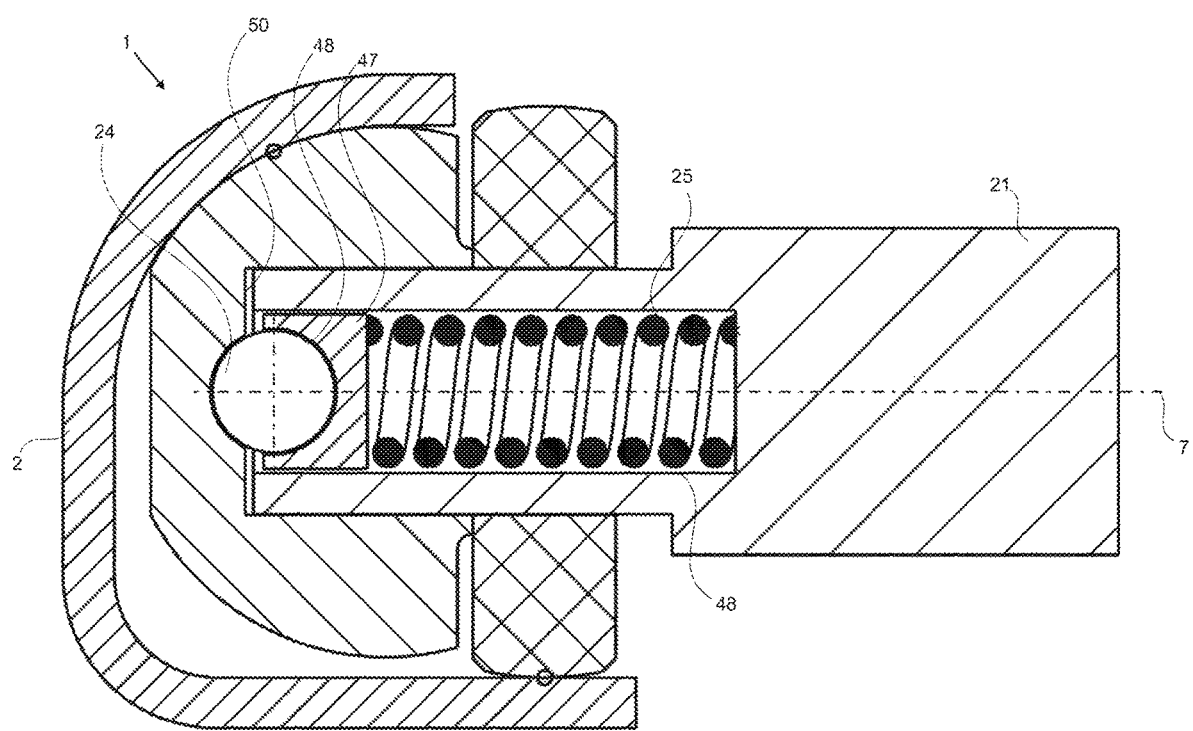
FIG. 2 shows a roller guide according to a further embodiment.

FIG. 2 shows a further embodiment, wherein the spring element 23 is configured differently in FIG. 2 than shown in FIG. 1. Otherwise, FIG. 1 and FIG. 2 are designed identically. For clarity, some reference signs have been omitted because they correspond with those of FIG. 1.

According to the embodiment of FIG. 2, the spring element 23 comprises a ball element 24 and a pre-tensioned compression spring 25, which is in contact on the one side with the shaft 21 and also the ball element 24. The ball element 24 is preferably connected to a ball holder 48, which has a recess 48, which is designed such that it can accommodate the ball element 24. The compression spring 25 and the ball holder 48 are linearly displaceable in a borehole 49, which extends proceeding from the first end 22 of the shaft 21 in the direction L.

Furthermore, the ball element 24 is in contact with the first roller 5, to be able to spring in accordance with forces which occur because of movements in the direction L and to be able to absorb the forces. Similarly to the design of the spring element 23 of FIG. 1, the spring element 23 of FIG. 2 is also only in contact with the inner end face 50 of the first roller 5, and therefore the friction forces can also be reduced here.

Figure 3:
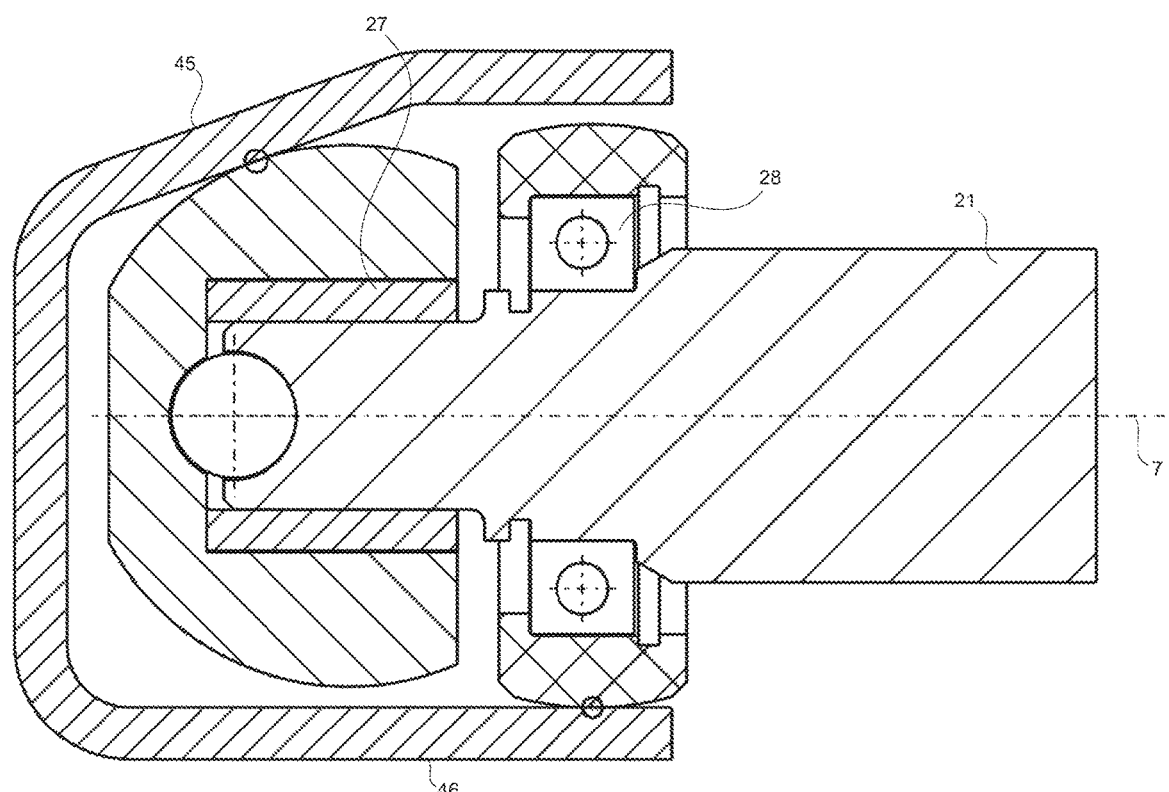
FIG. 3 shows a roller guide according to a further embodiment.

A further preferred embodiment of the present invention can be inferred from FIG. 3. In particular, the legs 45, 46, viewed in the direction L, are formed approximately equally long, wherein the leg 45 is formed so as not to be in contact with the second roller 6. The first planar region 3 comprises in this case a first level portion 19, which is in contact according to the invention with the first surface rolling region 10. Furthermore, alternative bearings of the rollers 5, 6 can be seen, which are conceivable for any arbitrary embodiment. The bearings of the first roller 5 and/or the second roller 6 comprise at least one selected from a group comprising a needle bearing, a ball bearing, or a combination thereof. According to the present FIG. 3, the first roller 5 is mounted via a needle bearing 27, while in contrast, the second roller 6 is mounted via a ball bearing 28 in relation to the shaft 21.

In addition, it can be seen that the first roller 5 and the second roller 6 do not form a contact surface, i.e. the rollers 5, 6 are spaced apart from one another viewed in the direction L.

Figure 4:
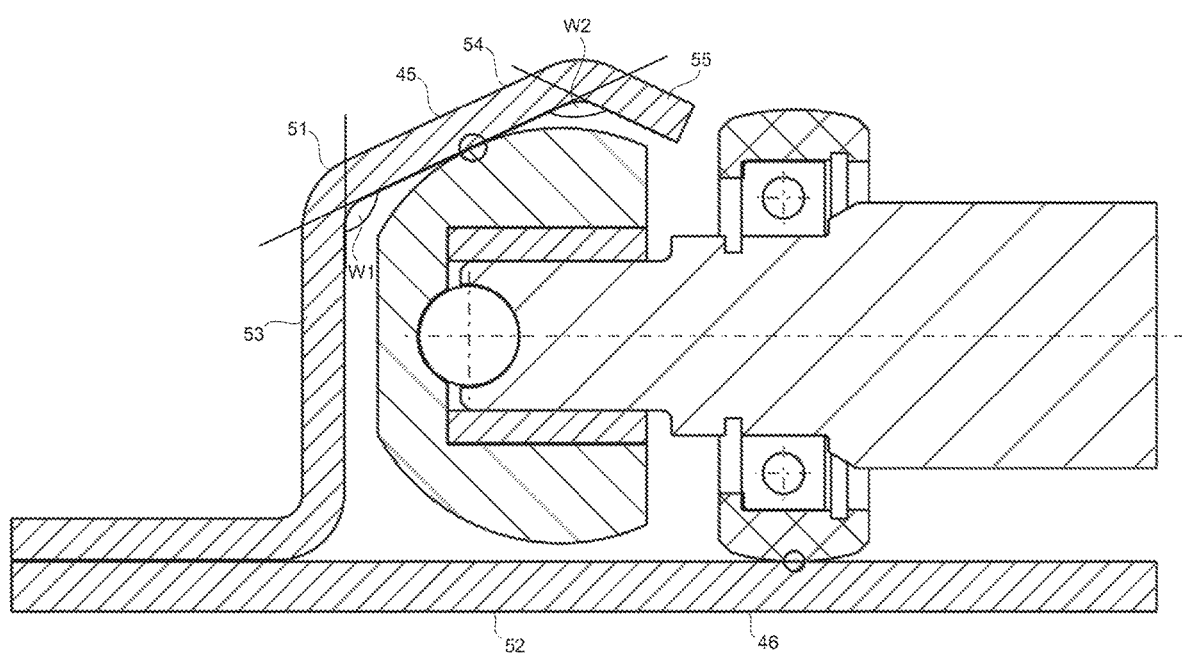
FIG. 4 shows a roller guide according to a further embodiment.

The embodiment according to FIG. 4 is similar to the embodiment according to FIG. 3, but the guide rail 2 is designed differently. The fundamental U shape of the guide rail 2 does not change, but the design or the shape of the respective legs 45, 46 changes. The guide rail 2 consists in the present case of a first guide rail part 51, which embodies the first leg 45, and a second guide rail part 52, which embodies the second leg 46. Furthermore, the first guide rail part 51 and the second guide rail part 52 are connected to one another and overall form the guide rail 2. The second guide rail part 52 is preferably designed as level, while in contrast, the first guide rail part 51 has a different shape.

In the present case, the first guide rail part 51 may be divided into a first guide rail part portion 53, a second guide rail part portion 54, and a third guide rail part portion 55, wherein the first guide rail part portion 53 is formed perpendicularly to the second guide rail part 52. Furthermore, the second guide rail part portion 54 is preferably arranged at an obtuse angle W1 in relation to the first guide rail part portion 53 and the third guide rail part portion 55 is arranged at an obtuse angle W2 in relation to the second guide rail part portion 54.

Such a design of the guide rail 2 in particular increases the tensile strength of the roller guide 1.

Figure 5:
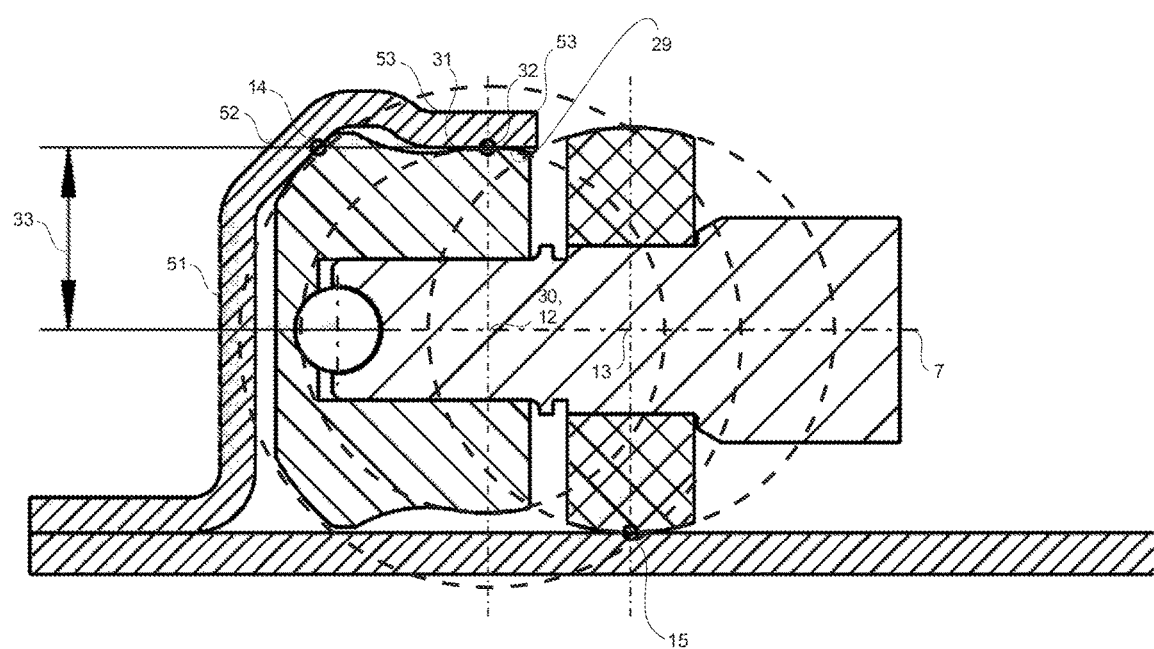
FIG. 5 shows a roller guide according to a further embodiment.

A particularly preferred embodiment can be seen according to FIG. 5, wherein the first roller 5 has a third circular-segment-shaped surface rolling region 29 having a third centre point 30, wherein the third surface rolling region 29 is in contact with a third planar region 31 of the guide rail 2 via a third contact point 32.

In this case, the first planar region 3 and also the third planar region 31 are each embodied such that a level portion is provided. However, it is also conceivable that the first and third planar regions 3, 31 are formed in the shape of circular segments. However, it is also conceivable that the first planar region and/or the third planar region is selected from a circular-segment-shaped portion or a level portion.

The first circular-segment-shaped surface rolling region 10 and the third circular-segment-shaped surface rolling region 29 have the same centre point but have different radii. The circular arcs of the surface rolling regions 10, 29 are therefore parts of concentric circles. In particular, the first contact point 14 and the third contact point 32 have the same radial distance to the axis of rotation 7. The whole circle associated with the circular-segment-shaped surface rolling regions is indicated by dashed lines.

The design of the guide rail 2 is similar to the design according to FIG. 4, while in contrast, the third guide rail part portion 55 extends perpendicularly to the first guide rail part portion 53, i.e. in the direction L of the axis of rotation 7.

Such a design as shown in FIG. 5 has the following further advantages. The first contact point 14 assumes forces in the direction L and the third contact point 30 assumes forces in the direction H, while in contrast, the second contact point 15 is still responsible for preventing clamping of the first roller 5 and assumes forces in the direction H in the event of load changes or the like.

A further relief of the rollers, in particular the first roller 5, in the direction H is achieved by the formation of three contact points 14, 15, 30. Because the first contact point 14 and the third contact point 30 have the same radial distance to the axis of rotation 7, they also have the same linear velocity, which results in a slip-free rolling movement of the first roller 5.

Figure 6:
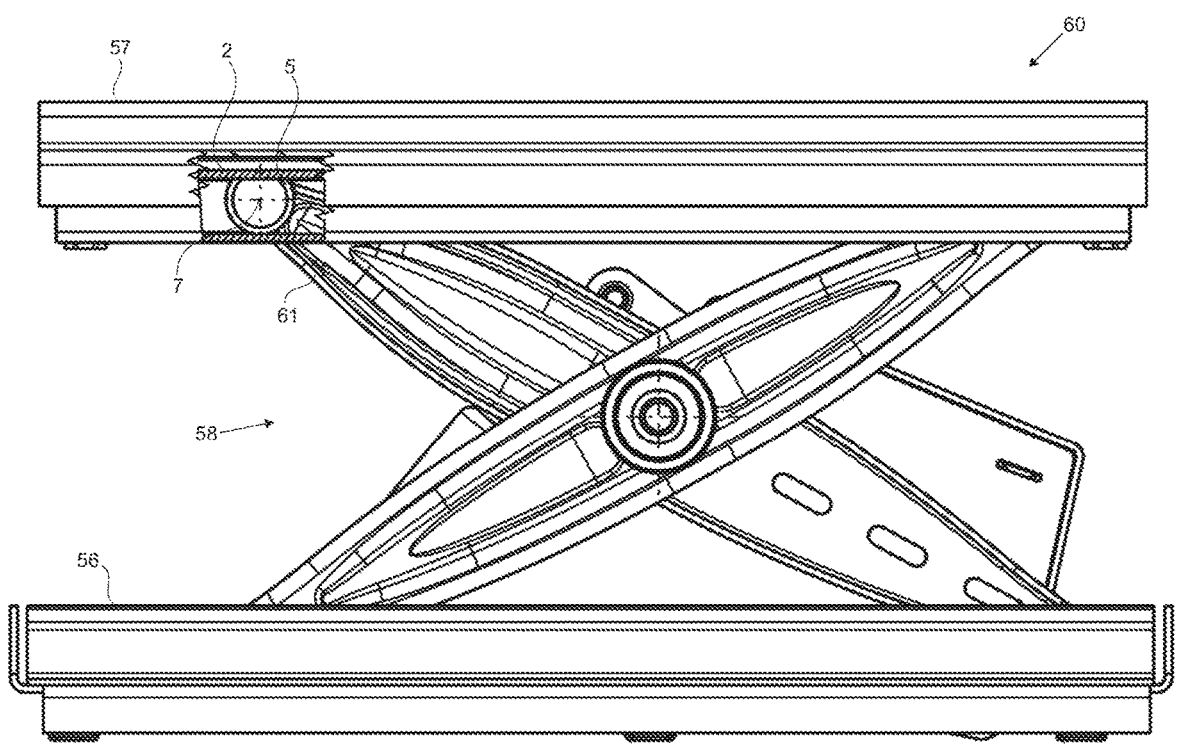
FIG. 6 shows a seat substructure comprising a roller guide.

FIG. 6 shows a possible application of the roller guide according to the present invention. A seat substructure 60 is shown according to FIG. 6, comprising a seat lower part 56 and a seat upper part 57, which are connected to one another by a scissors framework 58 such that a relative movement of the seat upper part 57 in relation to the seat lower part 56 is possible.

A roller guide 1 is, as can be inferred from FIG. 6, for example, connected on the one side to the seat upper part 57 and also to a scissors arm 61 of the scissors framework 58. The seat lower part 56 also has a roller guide 1, but it is not shown in greater detail in this case. In particular, the shaft 21 is connected to the scissors arm 61. A relative movement of the seat upper part 57 in relation to the seat lower part 56 is made possible by this design.

All the features disclosed in the application documents are claimed as essential to the invention, if they are novel individually or in combination over the prior art.

LIST OF REFERENCE SIGNS

1 roller guide
2 guide rail
3 first planar region
4 second planar region
5 first roller
6 second roller
7 axis of rotation
8 distance of the first roller
9 distance of the second roller
10 first circular-segment-shaped surface rolling region
11 second circular-segment-shaped surface rolling region
12 centre point of the first surface rolling region
13 centre point of the second surface rolling region
14 first contact point
15 second contact point
16 first circular-segment-shaped portion
17 radius
18 first radius of the first surface rolling region
19 first level portion
20 second level portion
21 shaft
22 first end
23 spring element
24 ball element
25 compression spring
26 bearings
27 needle bearing
28 ball bearing
29 third circular-segment-shaped surface rolling region
30 third centre point
31 third planar region
32 third contact point
33 radial distance
34 free space
35 contact surface
36 relief region
37 extent
38 transition region
39 front region
40 rear region
41 front distance
42 rear distance
43 longitudinal distance 44 longitudinal extension
45 first leg
46 second leg
47 ball holder
48 recess
49 borehole
50 inner end face
51 first guide rail part
52 second guide rail part
53 first guide rail part portion
54 second guide rail part portion
55 third guide rail part portion
56 seat lower part
57 seat upper part
58 scissors framework
60 seat substructure
61 scissors arm
W1 angle
W2 angle
L extension direction
R radial direction
H vertical direction

What is claimed is:

1. A roller guide, comprising:
at least one guide rail, which has at least one first planar region and one second planar region, and comprising a first roller and a second roller, which are each in contact with the guide rail and roll thereon, wherein the first and the second rollers are mounted so that they are rotatable about a common axis of rotation and are formed rotationally-symmetrically about the axis of rotation and a distance of the first roller is less than a distance of the second roller,
wherein the first roller has a first circular-segment-shaped surface rolling region and the second roller has a second circular-segment-shaped surface rolling region and a center point of the first surface rolling region and a center point of the second surface rolling region are arranged on the axis of rotation.

2. The roller guide according to claim 1, wherein the first roller is in contact by means of the first circular-segment-shaped surface rolling region with the first planar region via a first contact point and the second roller is in contact by means of the second circular-segment-shaped surface rolling region with the second planar region via a second contact point.

3. The roller guide according to claim 1, wherein the first circular-segment-shaped surface rolling region and the second circular-segment-shaped surface rolling region are arranged in a common plane which comprises the axis of rotation.

4. The roller guide according to claim 1, wherein the first planar region has a first circular-segment-shaped portion having a radius which is larger than a radius of the first circular-segment-shaped surface rolling region, or the first planar region has a first level portion.

5. The roller guide according to claim 1, wherein the second planar region has a second level portion.

6. The roller guide according to claim 1, wherein the roller guide has a shaft rotatable about the axis of rotation, on which the first roller and the second roller are arranged, wherein the shaft has at least one pre-tensioned spring element at a first end and wherein the spring element is at least in operational contact with the first roller.

7. The roller guide according to claim 6, wherein the pre-tensioned spring element consists at least in part of an elastomer.

8. The roller guide according to claim 6, wherein the pre-tensioned spring element has a ball element and a pre-tensioned compression spring, wherein the ball element is pre-tensioned by means of the compression spring.

9. The roller guide according to claim 1, wherein bearings of the first roller and bearings of the second roller each comprise one selected from a group comprising a needle bearing, a ball bearing, or a combination thereof.

10. The roller guide according to claim 1, wherein the first roller has a third circular-segment-shaped surface rolling region having a third centre point, which is arranged on the axis of rotation, wherein the first roller is additionally in contact by means of the third circular-segment-shaped surface rolling region with a third planar region of the guide rail via a third contact point.

11. The roller guide according to claim 10, wherein the first contact point and the third contact point have the same radial distance to the axis of rotation.

12. The roller guide according to claim 1, wherein the first roller is exclusively in contact by means of the first contact point with the first planar region and the second roller is exclusively in contact by means of the second contact point with the second planar region.

13. The roller guide according to claim 10, wherein the first roller is exclusively in contact with the first planar region and the third planar region and the second roller is exclusively in contact with the second planar region.

14. A vehicle seat, comprising the roller guide according to claim 1.

* * * * *